(12) United States Patent
Kircher

(10) Patent No.: US 7,926,827 B2
(45) Date of Patent: Apr. 19, 2011

(54) BOARDING AND/OR ENTERING AID FOR VEHICLES THAT CARRY PASSENGERS

(76) Inventor: Werner Kircher, Ahnatal (DE)

( * ) Notice: Subject to any disclaimer, the term of this patent is extended or adjusted under 35 U.S.C. 154(b) by 159 days.

(21) Appl. No.: 11/944,706

(22) Filed: Nov. 26, 2007

(65) Prior Publication Data

US 2008/0122196 A1 May 29, 2008

(30) Foreign Application Priority Data

Nov. 24, 2006 (DE) .......................... 10 2006 056 112

(51) Int. Cl.
*B60R 3/02* (2006.01)
(52) U.S. Cl. ....................................... 280/166; 403/363
(58) Field of Classification Search .................. 280/163, 280/164.1, 164.2, 165, 166, 169; 403/292, 403/294, 335, 336, 361, 363, 375, 381, 401, 403/402

See application file for complete search history.

(56) References Cited

U.S. PATENT DOCUMENTS

| 3,341,223 | A | * | 9/1967 | Wampfler | 280/166 |
| 4,185,849 | A | * | 1/1980 | Jaeger | 280/166 |
| 4,479,737 | A | * | 10/1984 | Bergh et al. | 403/382 |
| 6,659,485 | B2 | * | 12/2003 | Ueno | 280/166 |
| 6,880,843 | B1 | * | 4/2005 | Greer, Jr. | 280/166 |
| 7,223,043 | B1 | * | 5/2007 | Andrews | 403/363 |
| 2003/0071434 | A1 | * | 4/2003 | Budd | 280/166 |

FOREIGN PATENT DOCUMENTS

| DE | 1 906 283 | 12/1964 |
| DE | 196 32 169 | 2/1998 |
| DE | 603 02 120 | 7/2006 |
| EP | 82420 A1 * | 6/1983 |
| EP | 1 393 977 | 3/2004 |

* cited by examiner

*Primary Examiner* — J. Allen Shriver, II
*Assistant Examiner* — John D. Walters
(74) *Attorney, Agent, or Firm* — Michael J. Striker

(57) ABSTRACT

A boarding and/or entry aid for vehicles for carrying passengers is described, having a rectangular frame (3) and a step plate (2) supported movably in it. The frame (3) has two parallel lateral parts (4), which are joined together at rear ends by an end profile (5) and in a region spaced apart from it by at least one bracing strut. The lateral parts (4), end profile (5) and bracing strut are provided according to the invention with positioning means (14, 15) that engage one another in form-locking fashion.

9 Claims, 4 Drawing Sheets

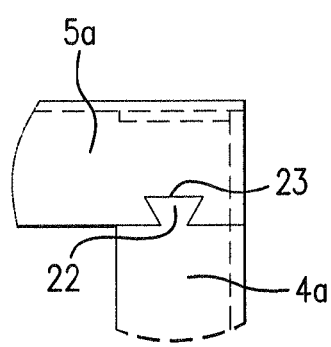
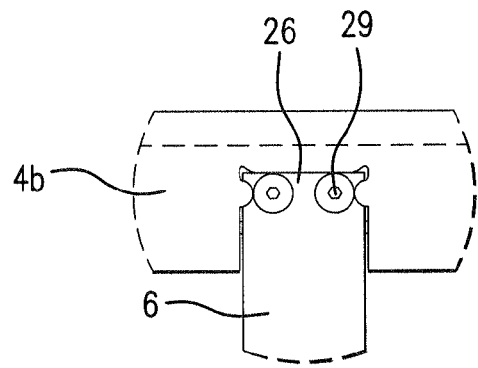
FIG. 6　　　　　　　　FIG. 7
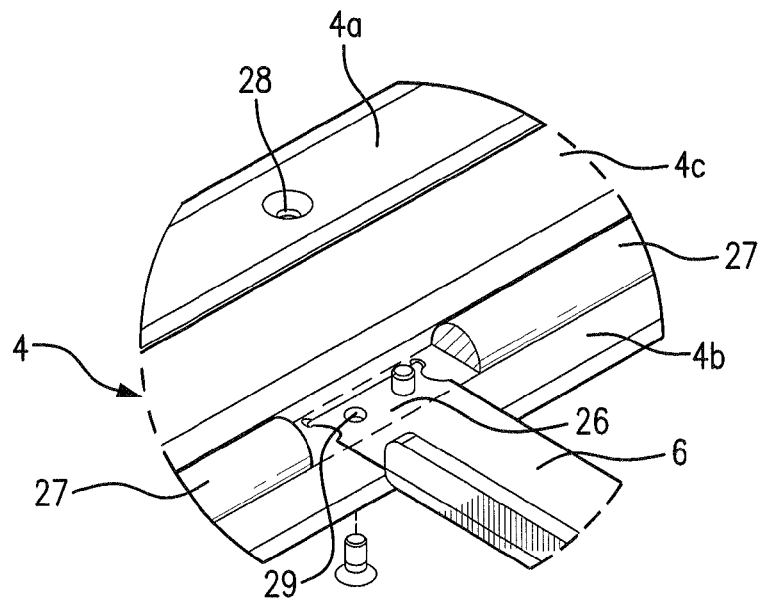
FIG. 8

BOARDING AND/OR ENTERING AID FOR VEHICLES THAT CARRY PASSENGERS

CROSS-REFERENCE

The invention described and claimed hereinabove is also described in application no. DE10 2006 056 112.0 filed on Nov. 24, 2006. This German Patent Application, whose subject matter is incorporated here by reference, provides the basis for a claim of priority of invention under 35 U.S.C. 119(a)-(d).

BACKGROUND OF THE INVENTION

Manifold forms of such boarding and/or entry aids are known. They are used in vehicles that carry passengers, such as public transit buses and rail cars, and they make it easier to board such vehicles and disembark from them by providing that a displaceable and optionally also pivotable step plate on each vehicle, in the form of a ramp, linear step, or the like, is deployed outward in the vicinity of transit stops. The term boarding and/or entry aid is understood also to include its use as an aid in disembarking from and exiting a vehicle.

The step plate, for instance of aluminum and provided with a slip-reducing covering, is coupled by its back side to a rolling carriage that is supported displaceably in rails mounted below the deck of the vehicle. They are preferably positioned, before a vehicle door is opened, between a standing and waiting area for passengers to be carried, such as a platform, and a deck surface in the entry area of the vehicle, so that any differences in height between these two areas and/or gaps between them can be compensated for or made more easily passable. This makes it possible for instance for wheelchair users and people pushing strollers to board and disembark easily. At the end of the disembarkation and boarding phase and optionally after the vehicle doors have been closed, the step plate is retracted to its outset position.

So that the step plate, together with the associated functional parts, can be installed as a complete structural unit, the rails for the rolling carriage are secured to the lateral parts of a rectangular frame, on which the drive means required for moving the rolling carriage back and forth are also installed. The frame overall comprises a welded construction and is mounted underneath the deck of the vehicle.

For exact tracking, the lateral parts and the rails secured to them must be oriented exactly parallel to one another. This is especially true if, to reduce production costs, it is desired that the rolling carriage be provided with only a single drive mechanism, functioning in the middle between the lateral parts.

Because of the requisite welding operations in assembling the lateral parts, end profiles and bracing struts that form the frame, exact parallelism cannot be ensured. For the same reasons, it is difficult to adhere to specified tolerances with regard to the length and width of the frame. It is therefore necessary that the parallelism of the rails and/or smooth displaceability of the rolling carriage be ensured in some other way. To that end, on the one hand, additional work steps are needed in the production and/or assembly of the frame, which is associated with an unwanted increase in production costs. On the other hand, comparatively great production tolerances must be accepted into the bargain, which is likewise as a rule unwanted.

SUMMARY OF THE INVENTION

With this as the point of departure, the object of the invention is to provide the boarding and/or entry aid of the type defined at the outset with a frame that can be produced with close tolerances and nevertheless comparatively inexpensively.

For attaining this object, it is proposed according to the invention that the lateral parts, end profile and bracing strut or bracing struts of the frame be provided with positioning means that engage one another in form-locking fashion.

By means of the positioning means of the invention, not only are the length and width of the frame fixed, but it is also ensured that the lateral parts are located exactly parallel. The frame according to the invention therefore has major advantages, above all in mass production. This is especially true whenever the positioning means comprise recesses and extensions that engage one another in the manner of puzzle pieces. It is possible to make such recesses and extensions with high precision, for instance by punching, but especially advantageously by laser cutting. Moreover, the invention makes it possible for the frame parts, to the extent necessary, despite the presence of the positioning means, to be produced in the form of shaped sheet-metal parts bent into a U, which lowers the production costs without loosening the close tolerances.

Further advantageous characteristics of the invention will become apparent from the dependent claims.

BRIEF DESCRIPTION OF THE DRAWINGS

The invention is described in further detail below in exemplary embodiments in conjunction with the accompanying drawings. Shown are:

FIG. 6, a second exemplary embodiment of positioning means that can be used as in FIG. 3;

FIG. 7, a view from below of a connection between a lateral part and a bracing strut of the frame of FIG. 1; and FIG. 8, the connection of FIG. 7, in a perspective view from above.

DESCRIPTION OF THE PREFERRED EMBODIMENTS

Figure 1:
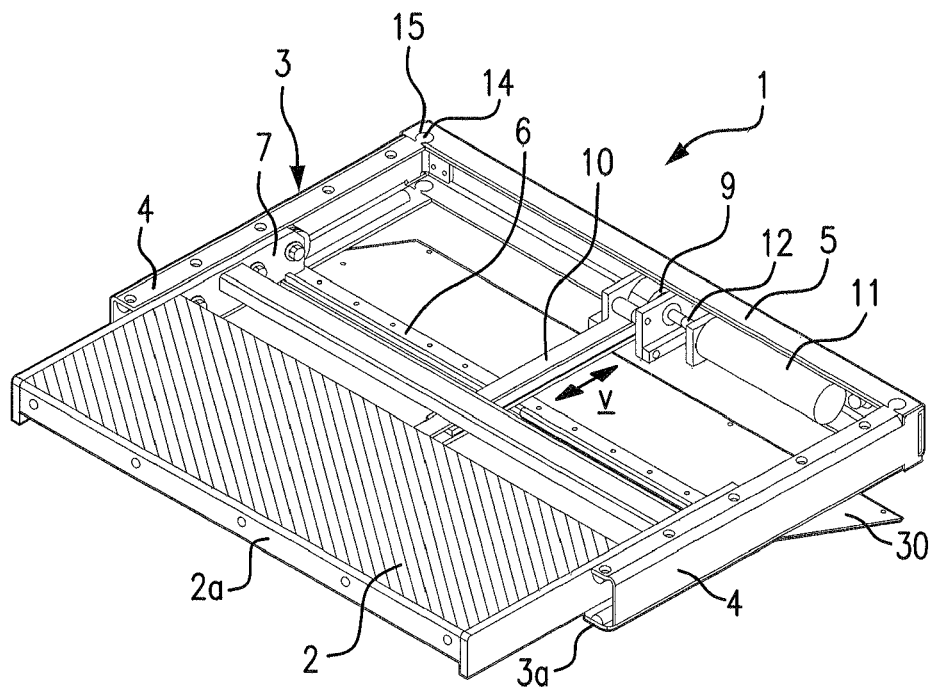
FIG. 1, a schematic perspective view of a boarding and/or entry aid according to the invention, with a frame and with a step plate supported extensibly and retractably on it.

FIG. 1 shows a boarding and/or entry aid 1 with a step plate 2, which is embodied on a bus or the like, for instance. The boarding and/or entry aid 1 of FIG. 1 has a rectangular frame 3 with two parallel lateral parts 4, which are joined at rear ends by an end profile 5 and, in a middle part, for instance, spaced apart from it, by at least one strut 6. The lateral parts 4 are preferably embodied as U-shaped guides which are open on the inward side and in which a rolling carriage 7 (FIG. 2) is guided displaceably by means of wheels 8. On a front end, the rolling carriage 7 is coupled to a rear end of the step plate 2. As a result, the step plate 2 can be driven forward and back again by the rolling carriage 7 parallel to the lateral parts 4, and as a result, with regard to the vehicle, not shown, either moved forward past a front end 3a of the frame 3 into an extended position, or returned to a retracted position, in which a front edge 2a of the step plate 2 is essentially flush with the front side 3a of the frame 3. Moreover, in a manner known per se, the step plate 2 may be coupled pivotably to the rolling carriage 7, so that in the extended state it forms a slightly downward-inclined ramp leading to a standing or waiting area, if the standing or waiting area is not at the same level as the frame 3.

If pivoting of the step plate is not necessary, then it itself can be provided with the wheels 8 in a rear region, and the rolling carriage 7 can be omitted entirely.

A rotatably supported deflection roller, not shown, is mounted in a front region of the frame 3 and cooperates with a drive roller 9 that is rotatably supported on the end profile 5. Both rollers are located in the middle between the two lateral parts 4, and they have pivot axes that extend parallel to the axes of the wheel 8 (FIG. 2) of the rolling carriage 7. Both rollers serve to guide an endless drive element 10, embodied for instance as a chain or toothed belt, which is connected to a rear end of the rolling carriage 7 or of the step plate 2 and extends in the middle between and parallel to the lateral parts 4. For driving purposes, a motor 11 is provided that is mounted on the end profile 5 and that has a driven shaft 12, which is coaxial with the pivot axis of the drive roller 9 and is connected to a drive shaft of the drive roller 9 via a coupling, not shown. The motor 11 is preferably embodied as a reversing motor, so that its driven shaft can be selectively rotated in one or the other direction of rotation. As a result, the drive element 10 and with it the rolling carriage 7 and the step plate 2 as well can be moved back and forth in the direction of a double arrow v (FIG. 1).

Figure 3:
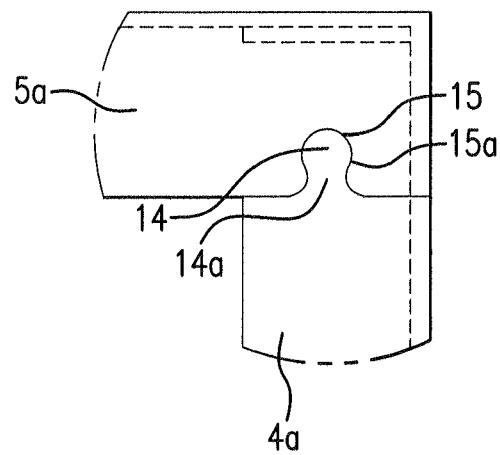
FIG. 3, a plan view on one exemplary embodiment of positioning means according to the invention that are intended for connecting two frame parts.

If the rolling carriage 7 is to be smoothly displaceable, the lateral parts 4 must be located exactly parallel, with only slight tolerances (in the range of 1/10 mm, for instance), regardless of how long they are in an individual case (up to 1500 mm long, for instance) and how wide the frame 7 is (for instance, up to 1500 mm wide). To achieve this, the procedure according to the invention is as follows:

The lateral parts 4, end profile 5 and bracing strut 6, wherever they are to be joined to one another, are provided with positioning means that engage one another in form-locking fashion. In the exemplary embodiment shown in FIGS. 3 and 4, of which in FIG. 3 a plan view is shown on an upper right corner, in terms of FIG. 1, of the frame 3 and in FIG. 4 a perspective view of an upper left corner, in terms of FIG. 1, of the frame 3 is shown, the lateral parts 4 and the end profile 5 have U-shaped cross sections and therefore two longitudinal bars 4a, 4b and 5a, 5b, each, and one middle bar 4c and 5c each that connect them. The lateral parts 4, on their ends joined by the end profile 5, are moreover provided with first positioning means formed onto the longitudinal bars 4a, 4b, and the end profile 5 is provided on its associated ends with second positioning means embodied in the longitudinal bars 5a, 5b. The first positioning means preferably comprise extensions 14, for instance of circular shape, and ribs 14a connected to them, by means of which they are attached to the longitudinal bars 4a, 4b. Conversely, the second positioning means preferably comprise circular recesses 15 that receive the extensions 14 and slots 15a that receive the ribs 14a and open into the recesses 15; the slots furthermore define the edges of the longitudinal bars 5a, 5b. As a result, as FIGS. 3 and 4 particularly show, it is possible for the end profile 5 to be slipped at its ends onto the lateral parts 4 in such a way that the extensions 14 and ribs 14a enter the recesses 15 and slots 15a as in a puzzle and are then retained in them in form-locking fashion and with exact relative positioning.

The lateral parts 4 and the end profile 5 preferably comprise shaped sheet-metal parts bent into the shape of a U. As FIG. 5 in particular shows, the lateral parts 4 and end profile 5 are made from originally flat sheet-metal blanks or the like, in which the first and second positioning means 14, 14a and 15, 15a, respectively, are embodied for instance by laser cutting, which can be done with quite close tolerances. Following that, the sheet-metal blanks are each folded along schematically indicated bending lines 16 and 17 (FIG. 5) by 90° each toward the same side, in order to obtain the U-shaped cross sections that can be seen in FIG. 4. It is clear that the bending lines 16, 17 are shown only schematically, and the blanks are not in fact edge-folded with sharp edges but rather bent over with short radii of curvature.

Figure 5:
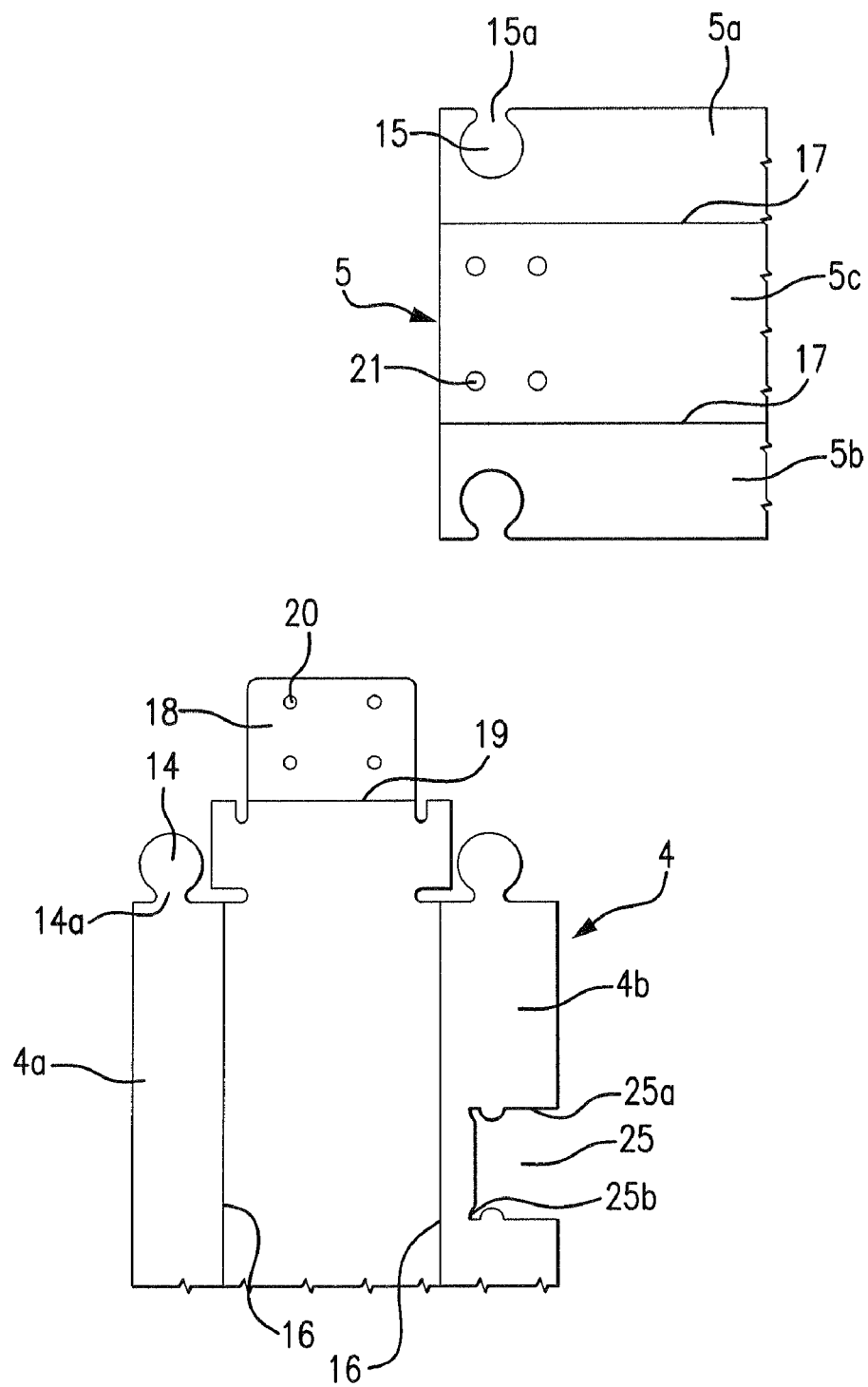
FIG. 5, a schematic plan view on a sheet-metal blank used for producing the lateral part and the end profile of FIG. 4.

As FIG. 5 also shows, at the ends of the middle bars 4c of the lateral parts 4 (and/or the ends of the middle bars 5c of the end profile 5), securing plates 18 are also formed on, which are bent over along a further bending line 19, likewise by approximately 90° and toward the same side as the longitudinal bars 4a, 4b and are provided with screw holes 20. These securing plates 18, as the end profile 5 is joined to the lateral parts 4, press from inside against the middle bars 5c of the end profile 5 (or of the applicable lateral part 4) in such a way that their screw holes 20 are aligned coaxially with screw holes 21 embodied in the middle bars 5c (and 4c, respectively). With the aid of fastening screws, not shown, that protrude through the screw holes 20, 21, the lateral parts 4 and the end profile 5 are then solidly joined to one another; their exact relative positioning continues to be predetermined by the first and second positioning means.

The first and second positioning means 14, 14a and 15, 15a can also, instead of being in the form of circular extensions and recesses, be in the form of triangular extensions and recesses, or other cross-sectional shapes. All that is important is that the positioning means each fit together in form-locking fashion and thereby define the relative positions of the lateral parts 4 and end profiles 5 longitudinally and transversely in an unambiguous way and with close tolerances. It is therefore naturally also possible to embody the first positioning means as recesses and the second positioning means as extensions, or to provide combinations of the two.

Joining the lateral parts 4 to the bracing strut 6 is expediently done in a corresponding way, as shown in FIGS. 5, 7 and 8. In the exemplary embodiment, the lower longitudinal bars 4b, in terms of FIGS. 1 and 8, of the lateral parts 4 are provided with third positioning means, which can fundamentally be embodied like the second positioning means 15, 15a, but in this exemplary embodiment do have a somewhat different shape. In particular, they comprise recesses 25 with preferably parallel side edges 25a which extend transversely to the lateral parts 4 and transversely to the bending lines 16 and adjoin the peripheral edges of the longitudinal bars 4b, and also comprise widened portions 25b adjoining the side edges 25a toward the inside, so that all in all, the third positioning means 25, 25a, 25b comprise cutouts with a substantially T-shaped contour. These cutouts are expediently produced before the bending operation and, like the recesses 15 and slots 15a, are open toward the edges.

Figure 4:
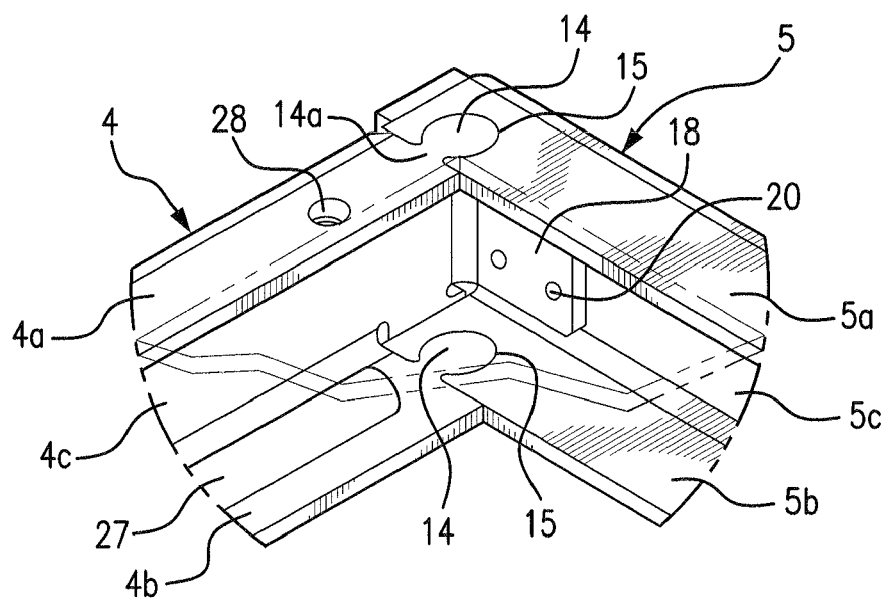
FIG. 4, a perspective view of a corner connection between the lateral part and an end profile of the frame of FIG. 1.

The other lateral part 4, which is not visible in FIG. 4, is provided on its lower longitudinal bar 4b with corresponding third positioning means, but these are embodied mirror-symmetrically to the positioning means 25, 25a, 25b of FIG. 5.

The bracing strut 6 is provided on both ends with fourth positioning means (FIGS. 7 and 8) in the form of extensions 26, which have an outer contour corresponding to the inner contour of the recesses 25 of the third positioning means and can therefore be placed with close tolerances and in puzzle-like fashion into the third positioning means. The described shape of the third and fourth positioning means, and in particular the presence of the side edges 25a and corresponding side edges on the extensions 26, offers the advantage that the bracing struts 6 come to rest in the lateral parts 4 in such a way that they are largely secure against relative rotation; that is, the positioning means 25 and 26 do not act as pivot bearings perpendicular to the plane defined by the longitudinal bars 4b and the bracing struts 6, the latter preferably produced from flat bars. Once the fourth positioning means 26 have been placed in the third positioning means 25, 25a, 25b, the surfaces of the bracing struts 6 and of the longitudinal bars 4b are preferably located in the same plane.

The third and fourth positioning means 25, 26, like the first and second positioning means 14, 15, are preferably produced by laser cutting, and in the case of the lateral parts 4, before the bending operation (FIG. 5). Once again, it is possible for the third positioning means to be embodied as extensions and the fourth positioning means as recesses, or to provide combinations of these.

Figure 2:
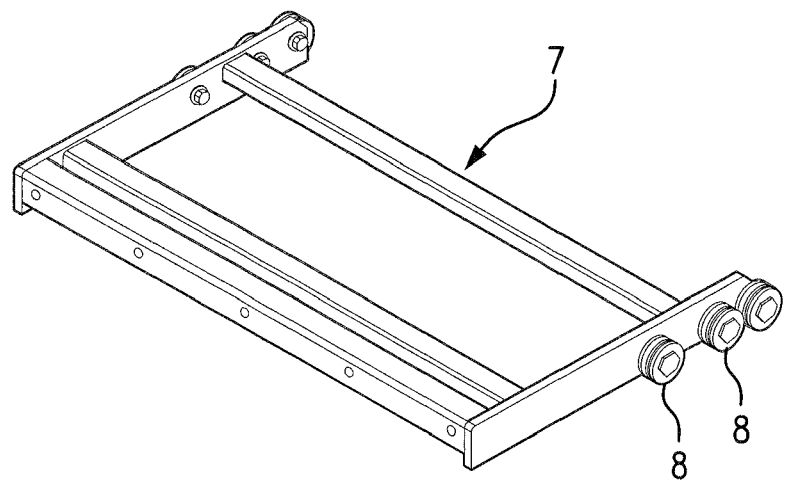
FIG. 2, a schematic perspective view of a rolling carriage, coupled to the step plate and guided displaceably in the frame of the boarding and/or entry aid of FIG. 1

A solid connection of the lateral parts 4 with the bracing strut 6 is created in the exemplary embodiment with the aid of rails 27 (FIG. 8), which are placed on the inner sides, facing one another, of the longitudinal bars 4a, 4b and serve the purpose of bracing and guiding, in a manner not shown in detail, the wheels 8 of the rolling carriage 7 (FIG. 2). For that purpose, on their undersides, the rails 27 have threaded bores, not shown and preferably embodied as blind bores, which after the rails 27 have been placed on the longitudinal bars 4a, 4b are aligned with continuous screw holes 28 (FIG. 8) that are embodied in the longitudinal bars 4a, 4b. By means of fastening screws screwed in from outside, the rails 27 are then fixed to the longitudinal bars 4a, 4b.

At the locations where the recesses or cutouts 25 (FIG. 5) forming the third positioning means rest, the rails 27, shown in fragmentary form in FIG. 8, likewise have at least one threaded bore, which is aligned with at least one continuous screw hole 29 in the extensions 26 that form the fourth positioning means. A fastening screw that passes from outside through the screw hole 29 can therefore be screwed into the applicable threaded bore of the rail 27 until its head rests from below against the extension 26 that forms the fourth positioning means and as a result connects it solidly to the rail 27 and by way of the rail to the frame 3 (FIG. 1). Naturally, it is possible, as shown, for two or more fastening screws per extension 26 to be used.

If needed, a plurality of such bracing struts 6 can moreover be joined to the lateral parts 4, in particular on the front end 3a (FIG. 1) of the frame 3 as well. The joining can also be done in the way described in conjunction with FIGS. 7 and 8. Furthermore, one of these bracing struts 6 can serve to secure the deflection roller, not shown, for the drive element 10 (FIG. 1).

A base, not shown, that covers the frame 3 underneath, can be secured to the undersides of the longitudinal bars 4b, 5b of the lateral parts 4 and end profile 5 and optionally of the bracing strut or bracing struts 6; this base protects the interior of the frame 3 and the wheels 8 and drive parts 9 through 12 located in it against getting dirty. This base preferably has a pivotable servicing hatch (FIG. 1), which can be pivoted downward and despite the covering allows easy access as needed to the drive parts 9 through 12 located in the rear region of the frame 3, which is advantageous especially for servicing purposes (cleaning, repair, maintenance, etc.) and makes complicated dismantling of the entire frame 3 or the like unnecessary. Alternatively, it can be provided that the base extends only as far as the last rear bracing strut 6, and the servicing hatch 30 can be secured pivotably to this bracing strut 6 by means of a strap hinge or the like.

An especially substantial advantage of the boarding and/or entry aid described is that the puzzle-like positioning means enable the parts 4, 5 and 6 to be located very precisely relative to one another, thereby making a parallel alignment of the two lateral parts 4 possible, along with an extremely torsionproof frame construction overall. Moreover, frames 3 can easily be produced with different dimensions, since all that is required for this is to provide lateral parts 4, end profiles 5 and bracing struts 6 of different lengths, which can all have the same first through fourth positioning means.

The invention is not limited to the exemplary embodiments described, which can be modified in manifold ways. This is true in particular for the shape and dimensions of the positioning means, which however are preferably always embodied such that they can be manufactured simply in the manner described. It is also possible for the first through fourth positioning means to be produced in some other way than by laser cutting, particularly by punching, for instance. In frames 3 of relatively small size, it can furthermore suffice to provide the bracing strut 6 on only the front end 3a (FIG. 1) of the frame 3, instead of or only in a middle part, and optionally to dispense with the servicing hatch 30. In addition, the wheels 8 may also be mounted in the rear region of the step plate 2, and in that case an additional rolling carriage is not needed. Finally, it is understood that the various characteristics may also be employed in other combinations than those described and shown.

The invention claimed is:

1. An aid for vehicles for carrying passengers, selected from the group consisting of a boarding aid, an entry aid, and both, having a rectangular frame (3) that has two parallel lateral parts (4), which are solidly joined together at rear ends by an end profile (5) and, in a region spaced apart from it, by at least one bracing strut (6), and having a step plate (2), supported movably on the lateral parts (4), wherein the lateral parts (4), the end profile (5), and the bracing strut (6) are provided with positioning means (14, 14a, 15, 15a; 25, 25a, 25b, 26) that engage one another in form-locking fashion, wherein the lateral parts (4) each have one middle bar (4c) and two longitudinal bars (4a, 4b) joined to it in the shape of a U, and the longitudinal bars (4a, 4b) are provided on their ends with first of the positioning means (14, 14a), which cooperate in form-locking fashion with second of the positioning means (15, 15a) embodied on associated ends of the end profile (5) wherein each of the longitudinal bars (4b) of the lateral parts (4) is provided with at least one third positioning means (25, 25a, 25b) each, and the bracing struts (6), on their ends, have fourth positioning means (26) that cooperate in form-locking fashion with the third positioning means (25, 25a, 25b), wherein one rail (27) for wheels (8) rotatably supported on the step plate (2) or on a rolling carriage (7) coupled to the step plate is secured to each of inner sides, facing one another, of the longitudinal bars (4a, 4b) of the lateral parts (4), wherein the third positioning means comprise recesses (25, 25a, 25b) in lower longitudinal bars (4b) of the lateral parts (4), and the fourth positioning means comprise extensions (26) that fit into these recesses (25, 25a, 25b); and that the bracing strut (6) is secured to the rails (27) by means of screws that pass through the extensions (26).

2. An aid as defined by claim 1, wherein the end profile (5) has a middle bar (5c) and two longitudinal bars (5a, 5b) joined to it in the shape of a U, and the longitudinal bars (5a, 5b) are provided on their ends with the second positioning means (15, 15a).

3. An aid as defined by claim 1, wherein the lateral parts (4) and the end profile (5) comprise shaped sheet-metal parts bent into the shape of a U.

4. An aid as defined by claim 1, wherein the bracing strut (6) comprises a flat bar.

5. An aid as defined by claim 1, wherein the positioning means (14, 14*a*, 15, 15*a*; 25, 25*a*, 25*b*, 26) are produced by laser cutting.

6. An aid as defined by claim 1, wherein at least one of the lateral parts (4) and the end profile (5) are provided on their ends with angled securing plates (18) for securing each other.

7. An aid as defined by claim 6, wherein the securing plates (18) are provided with screw holes (20).

8. An aid as defined by claim 1, wherein a base that covers the interior of the frame (3) is secured to at least one of the undersides of the lateral parts (4) and of the end profile (5).

9. An aid for vehicles for carrying passengers, selected from the group consisting of a boarding aid, an entry aid, and both, having a rectangular frame (3) that has two parallel lateral parts (4), which are solidly joined together at rear ends by an end profile (5) and, in a region spaced apart from it, by at least one bracing strut (6), and having a step plate (2), supported movably on the lateral parts (4), wherein the lateral parts (4), the end profile (5), and the bracing strut (6) are provided with positioning means (14, 14*a*, 15, 15*a*; 25, 25*a*, 25*b*, 26) that engage one another in form-locking fashion, wherein a base that covers the interior of the frame (3) is secured to at least one of the undersides of the lateral parts (4) and of the end profile (5), wherein the frame (3), in a rear region, has a servicing hatch (30) that can be pivoted downward.

* * * * *